(12) United States Patent
Beyabani

(10) Patent No.: US 8,392,940 B2
(45) Date of Patent: Mar. 5, 2013

(54) TELEVISION DISTRIBUTION OF PRODUCT/SERVICE COUPON CODES

(75) Inventor: Syed Zafar Beyabani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 547 days.

(21) Appl. No.: 12/166,925

(22) Filed: Jul. 2, 2008

(65) Prior Publication Data

US 2010/0004984 A1   Jan. 7, 2010

(51) Int. Cl.
| | |
|---|---|
| H04N 7/16 | (2011.01) |
| H04N 7/10 | (2006.01) |
| H04N 7/173 | (2011.01) |
| G06F 13/00 | (2006.01) |
| G06Q 30/00 | (2012.01) |

(52) U.S. Cl. ............ 725/23; 725/42; 725/34; 725/43; 725/51; 725/118; 725/131; 725/133; 725/153; 705/14.1

(58) Field of Classification Search .......... 725/23, 725/34, 42, 43, 51, 60, 109, 112, 118, 131, 725/133, 141, 153; 705/14.1, 14.11, 14.26
See application file for complete search history.

(56) References Cited

U.S. PATENT DOCUMENTS

| | | | | |
|---|---|---|---|---|
| 5,249,044 | A * | 9/1993 | Von Kohorn | 725/23 |
| 6,282,713 | B1 * | 8/2001 | Kitsukawa et al. | 725/36 |
| 6,360,254 | B1 * | 3/2002 | Linden et al. | 709/219 |
| 6,839,731 | B2 * | 1/2005 | Alexander et al. | 709/201 |
| 7,302,696 | B1 * | 11/2007 | Yamamoto | 725/23 |
| 7,406,508 | B1 * | 7/2008 | Herrmann et al. | 709/217 |
| 7,593,862 | B2 * | 9/2009 | Mankoff | 705/14.1 |
| 7,735,133 | B2 * | 6/2010 | Satomi | 726/21 |
| 7,779,097 | B2 * | 8/2010 | Lamkin et al. | 709/223 |
| 7,787,862 | B2 * | 8/2010 | Mossakowski | 455/411 |
| 7,877,776 | B2 * | 1/2011 | Krikorian et al. | 725/95 |
| 7,962,931 | B2 * | 6/2011 | Bova | 725/32 |
| 8,024,762 | B2 * | 9/2011 | Britt | 725/92 |
| 2002/0120927 | A1 * | 8/2002 | Harada et al. | 725/23 |
| 2003/0229893 | A1 * | 12/2003 | Sgaraglino | 725/37 |
| 2004/0103023 | A1 * | 5/2004 | Irwin et al. | 705/14 |
| 2004/0249712 | A1 * | 12/2004 | Brown et al. | 705/14 |
| 2006/0212401 | A1 * | 9/2006 | Ameerally et al. | 705/51 |
| 2007/0271188 | A1 * | 11/2007 | Burkholder | 705/52 |
| 2008/0021783 | A1 * | 1/2008 | Varghese | 705/14 |
| 2008/0077484 | A1 * | 3/2008 | Main et al. | 705/14 |
| 2008/0132163 | A1 * | 6/2008 | Ilan et al. | 455/3.06 |
| 2008/0154722 | A1 * | 6/2008 | Galinos | 705/14 |
| 2008/0167992 | A1 * | 7/2008 | Kokernak et al. | 705/51 |
| 2008/0183576 | A1 * | 7/2008 | Kim et al. | 705/14 |
| 2008/0244635 | A1 * | 10/2008 | Pollard et al. | 725/23 |
| 2008/0288600 | A1 * | 11/2008 | Clark | 709/206 |
| 2009/0063274 | A1 * | 3/2009 | Dublin et al. | 705/14 |
| 2009/0165140 | A1 * | 6/2009 | Robinson et al. | 726/26 |
| 2009/0172721 | A1 * | 7/2009 | Lloyd et al. | 725/23 |
| 2009/0172758 | A1 * | 7/2009 | Vantalon et al. | 725/110 |
| 2010/0014869 | A1 * | 1/2010 | Koplar et al. | 398/118 |
| 2010/0057549 | A1 * | 3/2010 | Boal | 705/14.23 |
| 2011/0103653 | A1 * | 5/2011 | Keswani et al. | 382/112 |
| 2011/0209188 | A1 * | 8/2011 | Petersson et al. | 725/110 |
| 2012/0095814 | A1 * | 4/2012 | Liu | 705/14.1 |

* cited by examiner

*Primary Examiner* — Pinkal R Chokshi

(57) ABSTRACT

A device receives an advertisement, a code, an encryption key, and information associated with a product and/or service, and provides the advertisement to a set-top box (STB) for display on a television. The device receives, from the STB, a request for a promotion associated with the advertisement and an identification associated with the STB, and provides the code associated with the product and/or service to the STB for display on the television. The device receives, from a user device, a claim for the code and the identification associated with the STB, and validates the claim for the code and the identification associated with the STB based on an identification associated with the user device.

25 Claims, 12 Drawing Sheets

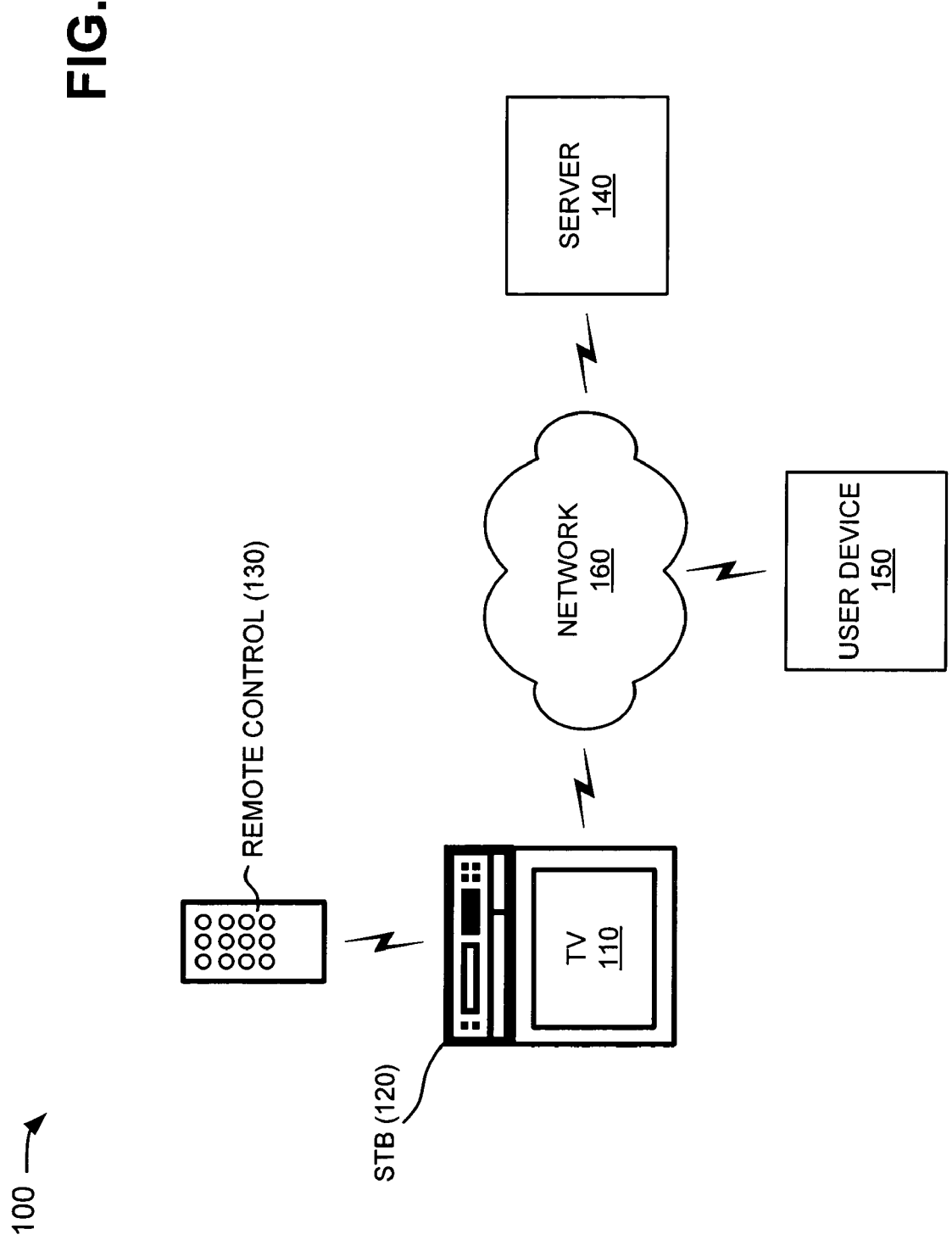

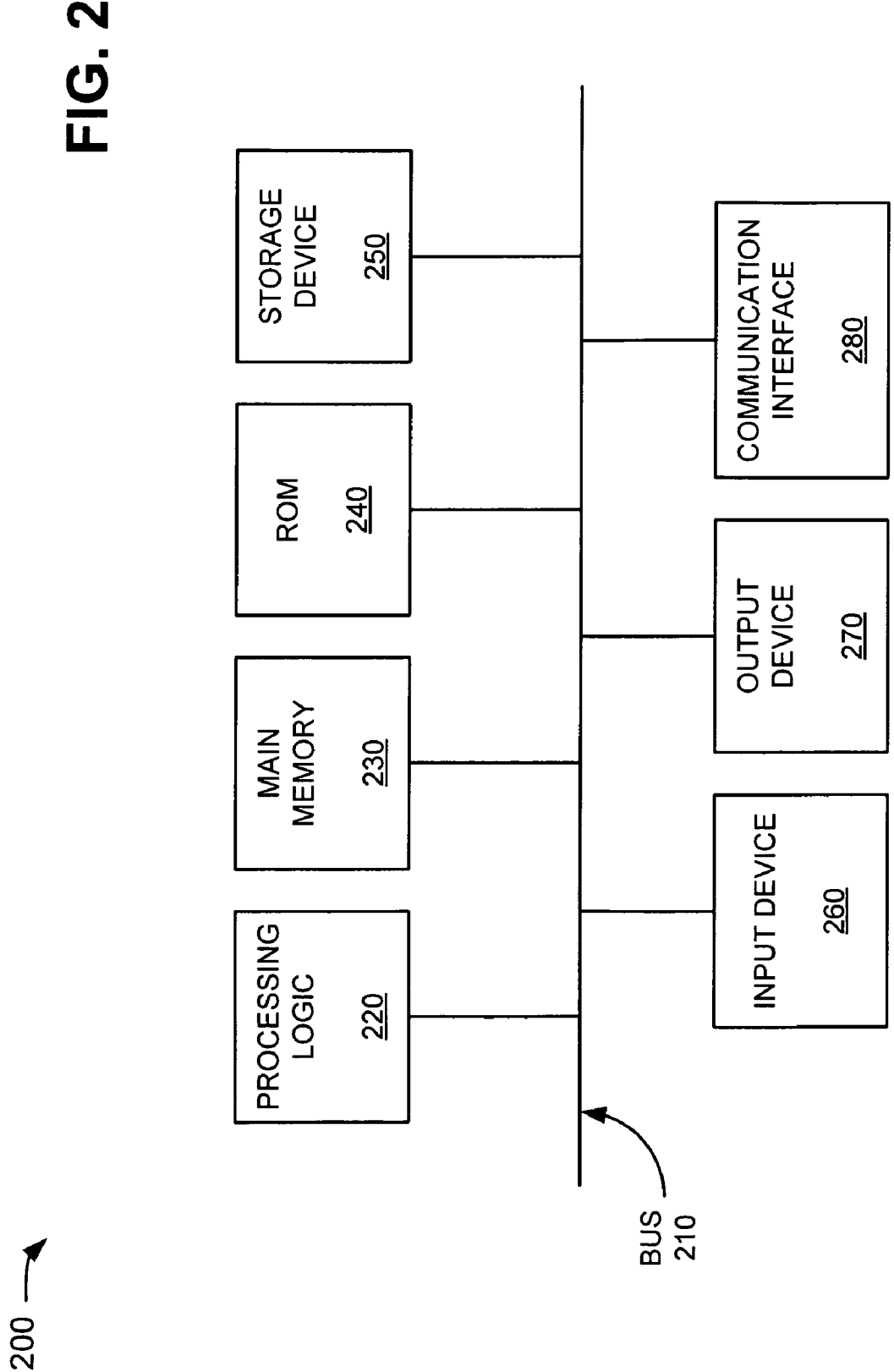

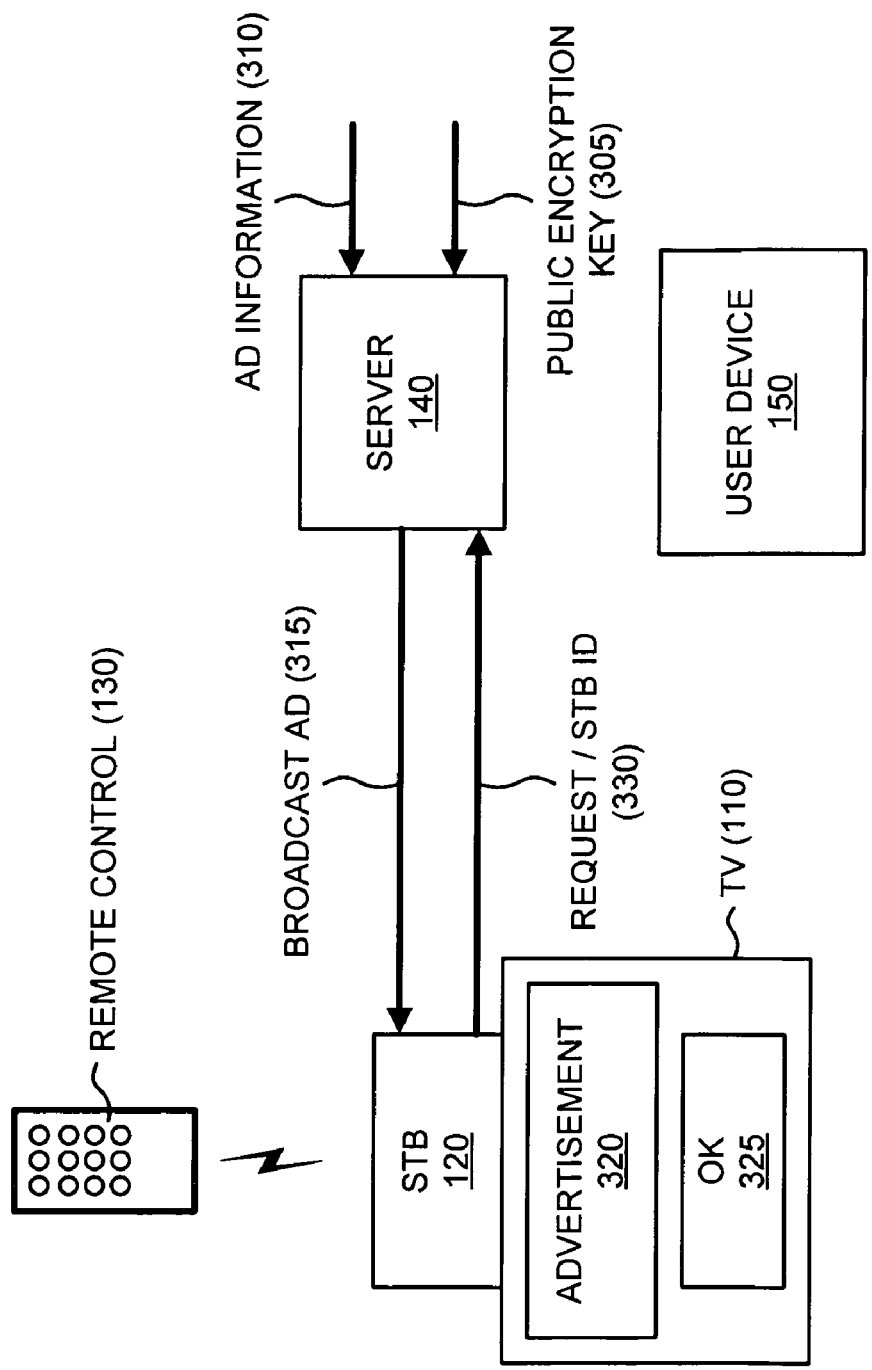

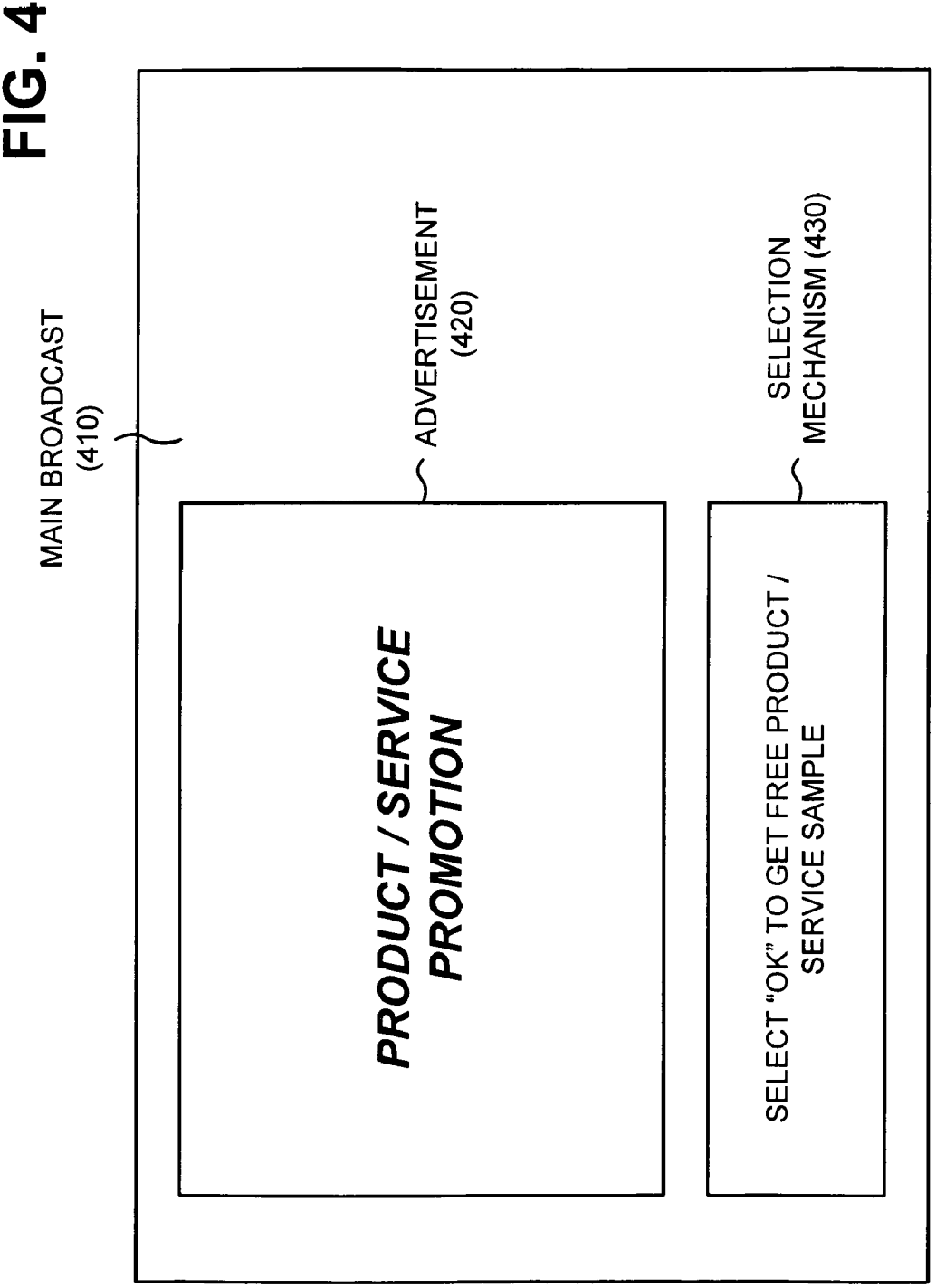

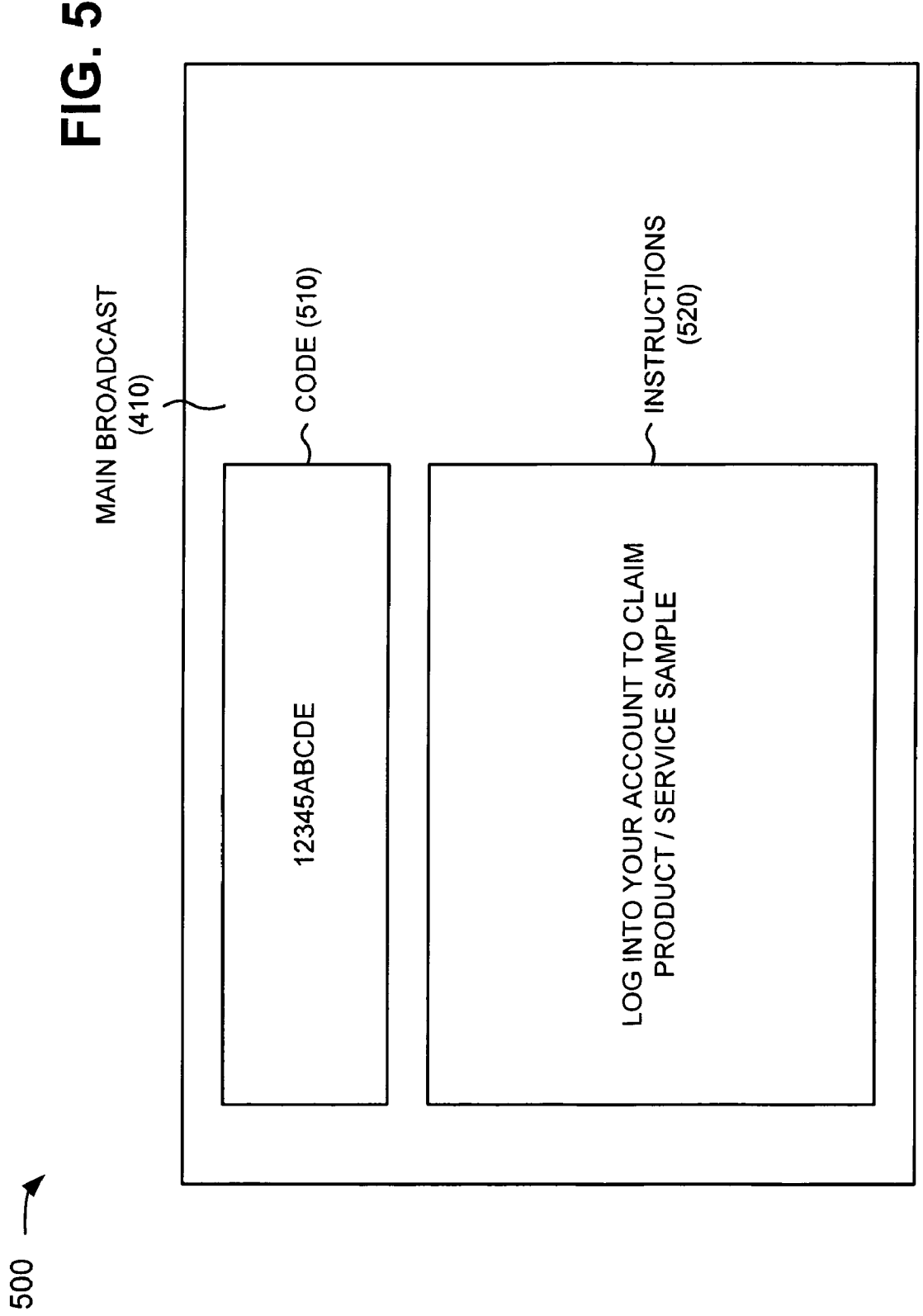

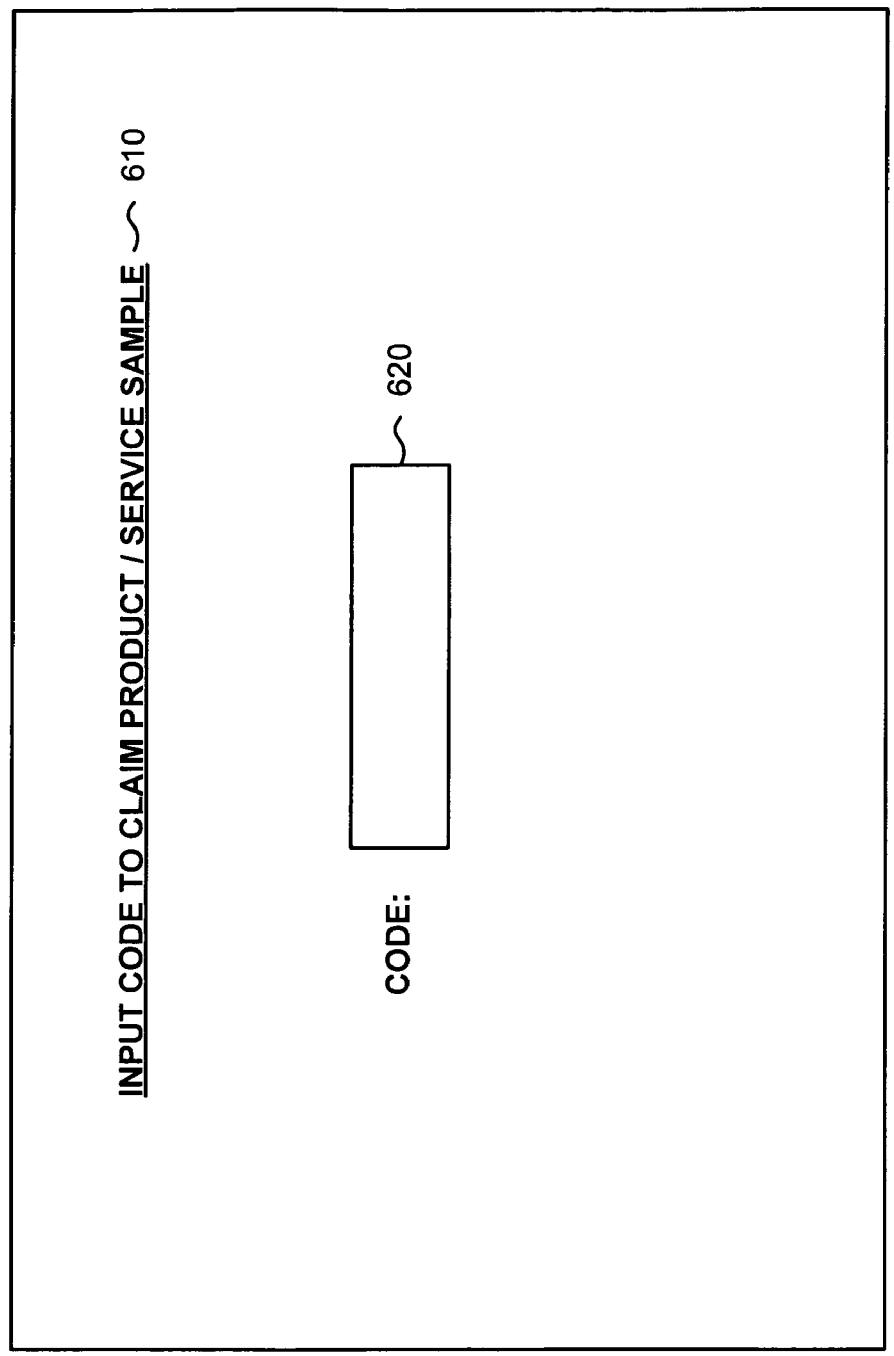

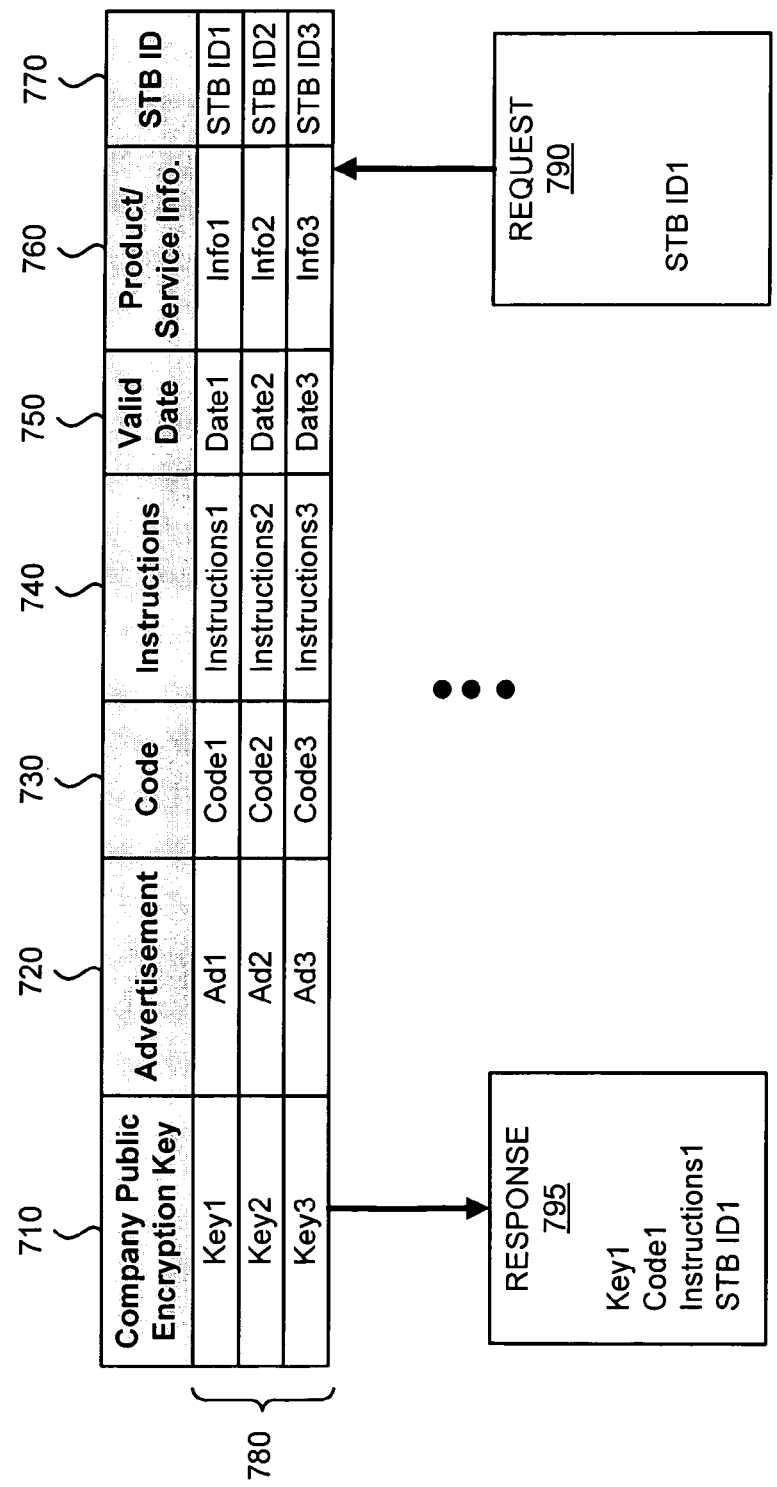

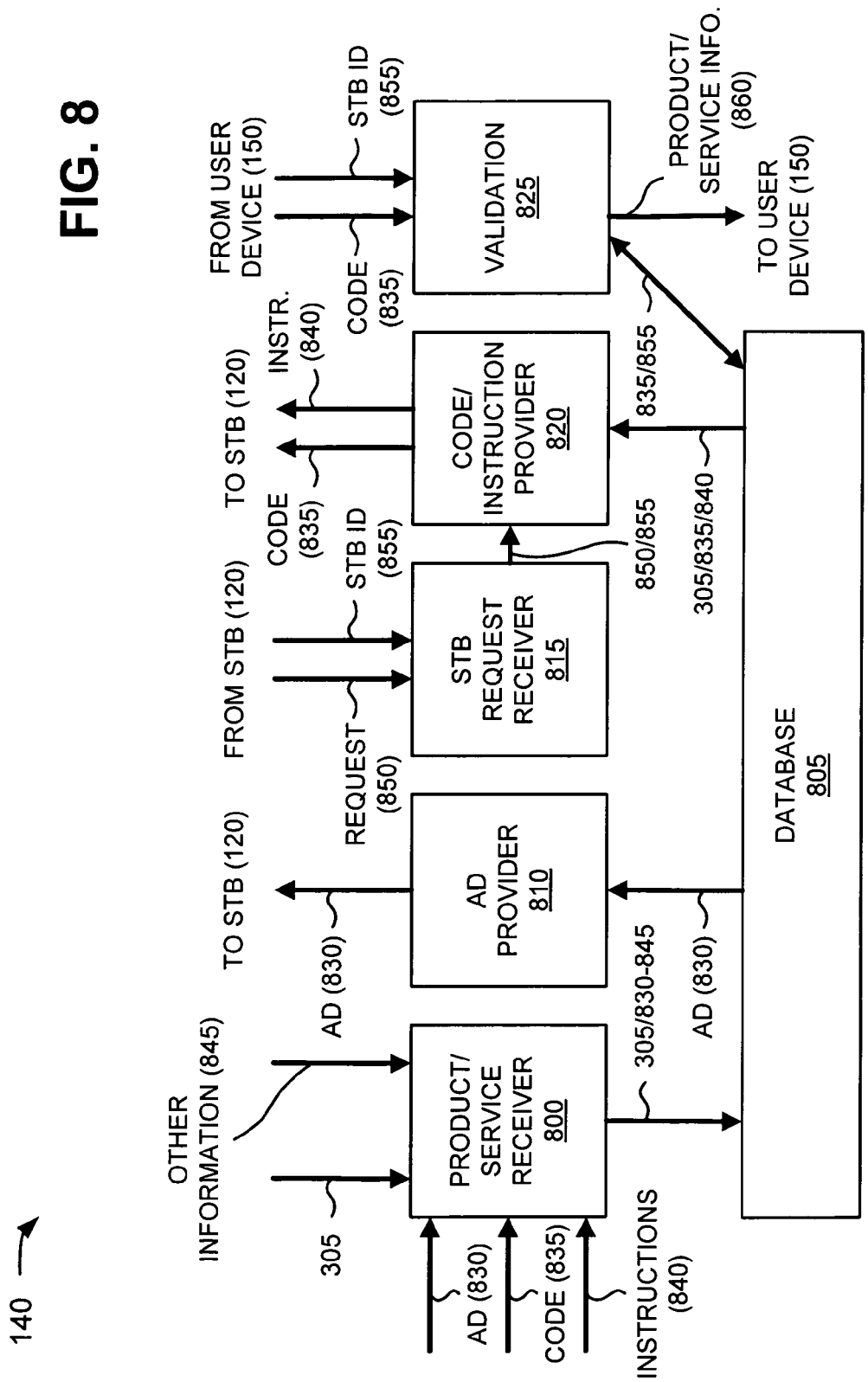

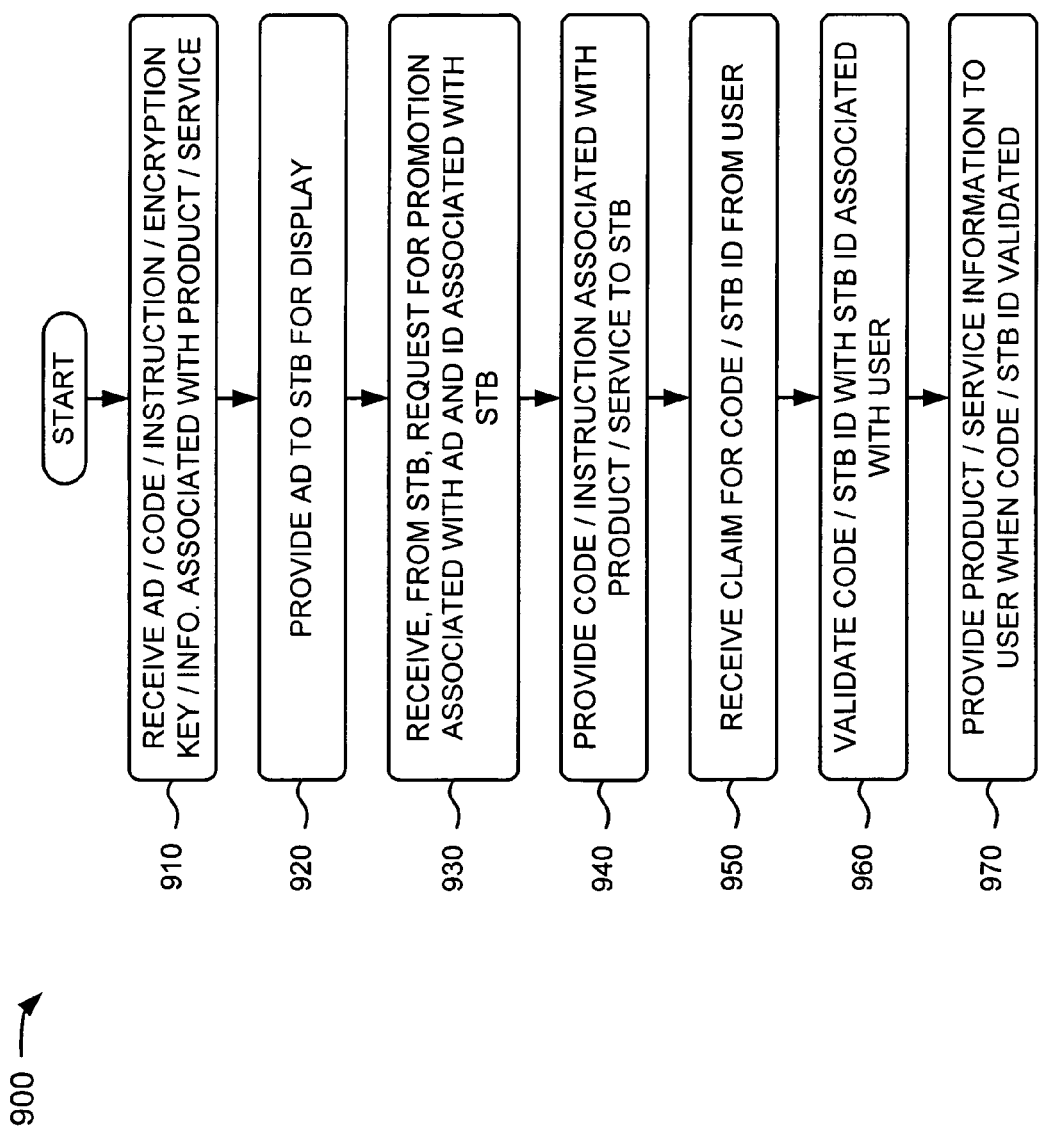

TELEVISION DISTRIBUTION OF PRODUCT/SERVICE COUPON CODES

BACKGROUND

Coupon codes may provide for reduced cost or free shipping, a specific dollar or percentage discount, or some other offer (e.g., samples, giveaways, raffles, promotions, etc.) to encourage consumers to purchase specific products and/or services, or to purchase from specific retailers. Coupon codes may be referred to as Internet coupons, promotional codes, promotion codes, discount codes, key codes, promo codes, shopping codes, voucher codes, source codes, validation codes, etc. Some manufacturers and retailers offer coupon codes that can be printed from a user's computer and redeemed in a store. Some of these coupon codes employ print controls and other security technologies in order to mitigate coupon fraud risks via online channels (e.g., via postings to "freebie" sites, unlimited prints, etc.).

Currently, companies cannot use television as a distribution channel for coupon codes. For example, coupon codes broadcast via television are susceptible to misuse because if the coupon code gets posted on the Internet, widespread damage for the company may ensue, a promotion associated with the coupon code may be discontinued, and legitimate users may be affected. Coupon codes broadcast via television may also encourage television viewers to use the coupon code more than once (e.g., double dipping) because usage of such coupon codes cannot be tracked. Furthermore, coupon codes broadcast via television may permit minors to request inappropriate products and/or services associated with the coupon codes because it cannot be determined who is viewing the television broadcast. In addition, the coupon codes broadcast via television may be recorded (e.g., via digital video recorder (DVR)), but may not be viewed until after time periods associated with coupon codes' promotions have expired. In other words, a mechanism does not exist that may inform a television viewer about expiration dates associated with coupon codes broadcast via television.

BRIEF DESCRIPTION OF THE DRAWINGS

FIG. 1 depicts a diagram of an exemplary network in which systems and methods described herein may be implemented;

FIG. 2 illustrates exemplary components of a set-top box (STB), a server, and/or a user device of the network depicted in FIG. 1;

FIGS. 3A and 3B depict a diagram of an exemplary portion of the network illustrated in FIG. 1;

FIGS. 4 and 5 illustrate diagrams of exemplary user interfaces capable of being generated by the STB and/or the server of the network depicted in FIG. 1;

FIG. 6 depicts a diagram of an exemplary user interface capable of being generated by the user device and/or the server of the network illustrated in FIG. 1;

FIG. 7 illustrates a diagram of a portion of an exemplary database capable of being provided in and/or managed by the server of the network illustrated in FIG. 1;

FIG. 8 depicts a diagram of exemplary functional components of the server of the network depicted in FIG. 1; and FIGS. 9-11 illustrate flow charts of an exemplary process according to implementations described herein.

DETAILED DESCRIPTION OF PREFERRED EMBODIMENTS

Figure 3B:
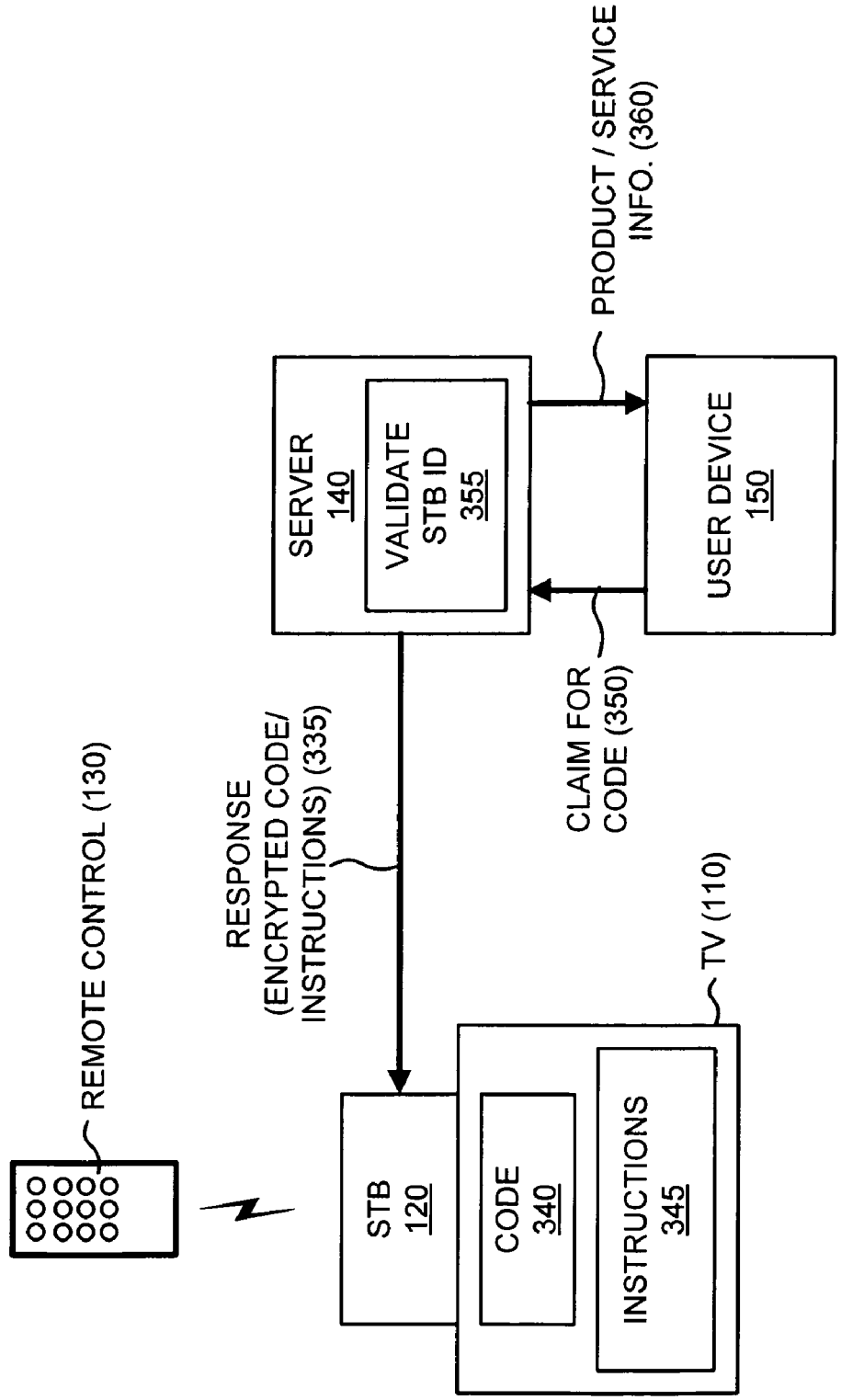

The following detailed description refers to the accompanying drawings. The same reference numbers in different drawings may identify the same or similar elements. Also, the following detailed description does not limit the invention.

Systems and/or methods described herein may enable companies to use television as a distribution medium for a coupon code (e.g., a product and/or service associated with the coupon code). The systems and/or methods may prevent coupon code misuse (e.g., posting of the coupon code on the Internet), may prevent double dipping (e.g., one use per coupon code), may prevent minors from requesting inappropriate products and/or services associated with the coupon code, and/or may guarantee that the coupon code may be redeemed within a limited time frame. In one implementation, for example, the systems and/or methods may receive an advertisement, a code, an instruction, an encryption key, and/or information associated with a product and/or service, and may provide the advertisement to a set-top box (STB) for display (e.g., via a television). The systems and/or methods may receive, from the STB, a request for a promotion associated with the advertisement and an identification associated with the STB, and may provide the code and the instruction associated with the product/service to the STB. The systems and/or methods may receive a claim for the code and a STB identification from a user (e.g., via a user device), may validate the code and the STB identification, and may provide the product/service information to the user when the code and the STB identification are validated.

"Code," as the term is used herein, is to be broadly construed to include, for example, a coupon code, an Internet coupon, a promotional code, a promotion code, a discount code, a key code, a promo code, a shopping code, a voucher code, a source code, a validation code, etc. A "product," as the term is used herein, is to be broadly interpreted to include anything that may be marketed or sold as a commodity or a good. For example, a product may include gas, bread, coffee, bottled water, milk, soft drinks, pet food, beer, diesel fuel, meat, fruit, etc. A "service," as the term is used herein, is to be broadly interpreted to include any act or variety of work done for others (e.g., for compensation). For example, a service may include a repair service (e.g., for a product), a warranty (e.g., for a product), telecommunication services (e.g., telephone services, Internet services, network services, radio services, television services, video services, etc.), etc.

As used herein, the terms "viewer" and/or "user" may be used interchangeably. Also, the terms "viewer" and/or "user" are intended to be broadly interpreted to include a user device, a STB, and/or a television or a user of a user device, STB, and/or television.

FIG. 1 is a diagram of an exemplary network 100 in which systems and methods described herein may be implemented. As illustrated, network 100 may include a television (TV) 110, a STB 120, a remote control 130, a server 140, and a user device 150 interconnected by a network 160. Components of network 100 may interconnect via wired and/or wireless connections. A single television 110, STB 120, remote control 130, server 140, user device 150, and network 160 have been illustrated in FIG. 1 for simplicity. In practice, there may be more televisions 110, STBs 120, remote controls 130, servers 140, user devices 150, and/or networks 160. Also, in some instances, one or more of the components of network 100 may perform one or more functions described as being performed by another one or more of the components of network 100.

Television 110 may include any conventional television monitor that is capable of displaying television programming, content provided by STB 120, and/or content provided by other devices (e.g., a digital video disk (DVD) player, a video camera, etc., not shown) connected to television 110.

STB 120 may include a conventional device that receives television programming (e.g., from server 140), and provides the television programming to television 110 or another device. STB 120 may allow a user to alter the programming provided to television 110 based on a signal (e.g., a channel up or channel down signal) from remote control 130. STB 120 may record video in a digital format to a disk drive or other memory medium within STB 120. In one exemplary implementation, STB 120 may be incorporated directly within television 110.

Remote control 130 may include a device that allows a user to control programming and/or content displayed on television 110 via interaction with STB 120.

Server 140 may include one or more server entities, or other types of computation or communication devices, that gather, process, search, and/or provide information in a manner described herein. In one implementation, server 140 may include a server (e.g., a computer system or an application), a cable head-end, or a broadcaster capable of providing content (e.g., TV programming, movies, on-demand services, live television, etc.), advertisements, instructions, codes, encryption keys, and/or other information associated with products and/or services, etc., to STB 120.

User device 150 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a lap top, a personal computer, or other types of computation or communication devices, threads or processes running on these devices, and/or objects executable by these devices. In one implementation, user device 150 may include any device (e.g., an Internet Protocol (IP)-based device) that is capable of accessing server 140 via network 160.

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

FIG. 2 is an exemplary diagram of a device 200 that may correspond to any of STB 120, server 140, and/or user device 150. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 160.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

FIGS. 3A and 3B depict a diagram of an exemplary portion 300 of network 100. As illustrated, exemplary network portion 300 may include television 110, STB 120, remote control 130, server 140, and user device 150. Television 110, STB 120, remote control 130, server 140, and user device 150 may include the features described above in connection with, for example, FIG. 1.

As further shown in FIG. 3A, server 140 may receive (e.g., from a company) a public (or shared) encryption key 305 and advertisement (ad) information 310 associated with a company wishing to use television as a distribution medium for a product and/or service associated with a coupon code. Public encryption key 305 may include a string of letters, digits or symbols that may be used to encode or decode information. In one implementation, public encryption key 305 may be used to encrypt information (e.g., transform the information into unreadable information). In another implementation, public encryption key 305 may be used to decrypt (or unencrypt) information (e.g., transform encrypted information into readable information). In still another implementation, public encryption key 305 may be a shared encryption key that may be used to encrypt and decrypt information (e.g., perform symmetric encryption). Advertisement information 310 may include an advertisement associated with a product and/or service, a code (e.g., a coupon code) associated with the advertisement, one or more instructions associated with the advertisement, a validity or expiration date associated with the code, product and/or service information, etc. In one implementation, server 140 may store public encryption key 305 and advertisement information 310 in a database.

As further shown in FIG. 3A, server 140 may broadcast an advertisement (e.g., an advertisement associated with a product and/or service), as indicated by reference number 315, on television 110, via STB 120. For example, STB 120 may receive broadcast advertisement 315 from server 140, and may display an advertisement 320 and a selection mechanism 325 on television 110. Advertisement 320 may include an advertisement (or promotion) associated with a product and/or or service. For example, advertisement 320 may include information, such as "Shop for used cars online using our database of pre-owned vehicles." Selection mechanism 325 may include a button (e.g., an "OK" button as illustrated in FIG. 3A), an icon, a link, and/or other similar selection mechanisms. In one example, selection mechanism 320 may include information, such as "Select OK to obtain a free product/service sample!" If a viewer of television 110 selects selection mechanism 325 (e.g., via remote control 130), STB 120 may provide a request and an identification associated with STB 120 to server 140, as indicated by reference number 330. In one implementation, the request may include a request for the promotion associated with advertisement 320. The STB identification may include information (e.g., a serial number, numbers, letters, etc.) identifying STB 120 to server 140. Server 140 may receive request/STB identification 330, and may confirm that the promotion associated with advertisement 320 is valid. For example, server 140 may determine whether the promotion associated with advertisement 320 expired, has already been claimed by the user associated with STB 120, etc.

As shown in FIG. 3B, if server 140 determines that the promotion associated with advertisement 320 is valid, server 140 may encrypt and provide a response 335 to STB 120. In one implementation, server 140 may encrypt response 335 with public encryption key 305. Response 335 may include a code 340 (e.g., a coupon code) associated with advertisement 320, and instructions 345 associated with code 340. In one exemplary implementation, code 340 may include a unique validation code that includes an identification associated with STB 120 and/or an identification associated with advertisement 320 (e.g., identification associated with a product/service promotion). Instructions 345 may include instructions for claiming the product/service promotion associated with code 340 (e.g., instructions to log into a web account associated with STB 120, such as a web account associated with television services provided by STB 120). As further shown in FIG. 3B, STB 120 may receive response 335, and may display code 340 and instructions 345 on television 110.

If a user associated with STB 120 views code 340 and/or instructions 345, the user (e.g., via user device 150) may access server 140 (e.g., may log into an account, associated with the user, that may be maintained by server 140), and may provide a claim 350 for code 340 to server 140. Claim 350 may involve the user inputting (e.g., via user device 150) code 340. Server 140 may receive claim 350 (e.g., code 340 input by the user), and may decrypt code 340 (e.g., via public encryption key 305) to obtain the identification associated with STB 120 and/or the identification associated with advertisement 320. Server 140 may validate the identification associated with STB 120 (and/or code 340), as indicated by reference number 355, and may provide product and/or service information 360 to user device 150 if the identification associated with STB 120 (and/or code 340) is validated by server 140. For example, in one implementation, server 140 may determine whether the identification associated with STB 120 matches a STB identification (e.g., provided in a database maintained by server 140), whether the promotion associated with code 340 is still valid, whether the user already claimed the promotion associated with code 340, etc. If the identification associated with STB 120 is not validated, server 140 may not provide product and/or service information 360 to user device 150.

Such an arrangement, as depicted in FIGS. 3A and 3B, may prevent code misuse (e.g., posting of the code on the Internet) by only permitting a user with a valid STB identification to redeem the code, and may prevent double dipping by limiting codes to one use per code. Such an arrangement may prevent minors from requesting inappropriate products and/or services associated with the code since minors may not be able to access a web account associated with STB 120 to claim the code. Furthermore, such an arrangement may guarantee that the code may be redeemed within a limited time frame by determining if the code has expired before providing products and/or services associated with the code.

Although FIGS. 3A and 3B show exemplary components of network portion 300, in other implementations, network portion 300 may contain fewer, different, or additional components than depicted in FIGS. 3A and 3B. In still other implementations, one or more components of network portion 300 may perform one or more other tasks described as being performed by one or more other components of network portion 300.

FIG. 4 illustrates a diagram of an exemplary user interface 400 capable of being generated by STB 120 and/or server 140 (e.g., and displayed via television 110). The user interface depicted in FIG. 4, and each of the user interfaces depicted in FIGS. 5 and 6 and described below (collectively referred to as "the user interfaces"), may include a graphical user interface (GUI) or a non-graphical user interface, such as a text-based interface. The user interfaces may provide information to users via a customized interface (e.g., a proprietary interface) and/or other types of interfaces (e.g., a browser-based interface, a television interface, etc.). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., output device 270).

As illustrated in FIG. 4, user interface 400 may include a main broadcast 410, an advertisement 420, and/or a selection mechanism 430. Information associated with user interface 400 may be selected by a user of STB 120 (e.g., via remote control 130).

Main broadcast 410 may include a television program being broadcast via STB 120 on television 110, a television commercial, a program guide provided by STB 120, video-on-demand provided by STB 120, etc.

Advertisement 420 may include may include an advertisement (e.g. advertisement 320) associated with a product and/or service. For example, advertisement 420 may include information, such as "Shop for used cars online using our database of pre-owned vehicles." In one implementation, advertisement 420 may include an advertisement associated with or otherwise related to content provided by main broadcast 410. For example, if main broadcast 410 provides financial information (e.g., a television program discussing the stock market), advertisement 420 may include an advertisement associated with financial services (e.g., a promotion provided by a bank). In other implementations, advertisement 420 may include an advertisement that is not associated with content provided by main broadcast 410.

Selection mechanism 430 may include a button, an icon, a link, and/or other similar selection mechanisms (e.g., instructions). For example, selection mechanism 430 may include information, such as "Select OK to obtain a free product/service sample!" If a viewer of television 110 selects selection mechanism 430 or follows instructions provided by selection mechanism 430 (e.g., via remote control 130), STB 120 may provide request/STB identification 330 to server 140.

Although user interface 400 depicts a variety of information, in other implementations, user interface 400 may depict fewer, different, or additional information than depicted in FIG. 4. For example, although advertisement 420 and selection mechanism 430 are depicted as overlaying a major portion of main program 410, in some implementations, advertisement 420 and/or selection mechanism 430 may overlay a smaller portion of main program 410 (i.e., may not block viewing of main program 410).

As described above in connection with FIG. 3A, server 140 may receive request/STB identification 330, and may confirm that the promotion associated with advertisement 320 is valid. If server 140 determines that the promotion associated with advertisement 320 is valid, server 140 may encrypt and provide response 335 to STB 120, and STB 120 may provide for display an exemplary user interface 500, as depicted in FIG. 5, based on response 335. Exemplary user interface 500 may be generated by STB 120 and/or server 140 (e.g., and displayed via television 110). As shown in FIG. 5, user interface 500 may include main broadcast 410, a code 510, and/or one or more instructions 520. Main broadcast 410 may include the features described above in connection with FIG. 4.

Code 510 (e.g., provided via response 335) may include a code (e.g., code 340) associated with advertisement 420. In one exemplary implementation, code 510 may include a unique validation code that includes an identification associated with STB 120 and/or an identification associated with advertisement 420 (e.g., identification associated with a product/service promotion). As shown in FIG. 5, code 510 may include a series of letters, numbers, letters and numbers, etc., such as "12345ABCDE."

Instructions 520 (e.g., provided via response 335) may include instructions (e.g., instructions 345) for claiming the product/service promotion associated with code 510. In one exemplary implementation, instructions 520 may include instructions to log into a web account associated with STB 120, such as a web account associated with television services provided by STB 120. For example, as shown in FIG. 5, instructions 520 may instruct a viewer to "log into your account to claim product/service sample" associated with code 510.

Although user interface 500 depicts a variety of information, in other implementations, user interface 500 may depict fewer, different, or additional information than depicted in FIG. 5. For example, although code 510 and instructions 520 are depicted as overlaying a major portion of main program 410, in some implementations, code 510 and/or instructions 520 may overlay a smaller portion of main program 410 (i.e., may not block viewing of main program 410).

If a user associated with STB 120 views code 510 and/or instructions 520, the user (e.g., via user device 150) may access server 140 (e.g., may log into an account, associated with the user, that may be maintained by server 140), and server 140 may provide for display (e.g., via user device 150) an exemplary user interface 600, as depicted in FIG. 6. As shown in FIG. 6, user interface 600 may include one or more instructions 610 and a code input mechanism 620.

Instructions 610 may include instructions for claiming a product/service promotion associated with a code (e.g., code 510). In one exemplary implementation, as shown in FIG. 6, instructions 610 may instruct a user to input a code (e.g., code 510) to claim a product/service sample associated with the code.

Code input mechanism 620 may include an input field, a drop-down menu, and/or other similar input mechanisms that may enable the user to input a code (e.g., code 510). The user may input the code via code input mechanism 620, and server 140 may receive the code input by the user, and may decrypt the code (e.g., via public encryption key 305) to obtain the identification associated with STB 120 and/or the identification associated with advertisement 420. Server 140 may validate the identification associated with STB 120, and may provide product and/or service information to user device 150 if the identification associated with STB 120 is validated by server 140.

Although user interface 600 depicts a variety of information, in other implementations, user interface 600 may depict fewer, different, or additional information than depicted in FIG. 6.

FIG. 7 illustrates a diagram of a portion 700 of an exemplary database capable of being provided in and/or managed by server 140. In one implementation, the information provided in database portion 700 may be provided via public encryption keys (e.g., public encryption key 305) and advertisement information 310 from companies wishing to use television as a distribution medium for products and/or services associated with codes (e.g., coupon codes). As illustrated, database portion 700 may include a variety of information associated with products and/or services. For example, database portion 700 may include a company public encryption key field 710, an advertisement field 7520, a code field 730, an instructions field 740, a valid date field 750, a product/service information field 760, a STB ID field 770, and/or a variety of entries 780 associated with fields 710-770.

Company public encryption key field 710 may include public encryption keys provided by and associated with companies (e.g., companies offering coupon codes). For example, company public encryption key field 710 may include entries for "Key1," "Key2," "Key3," etc. Each of the public encryption keys provided in company public encryption field 710 may include a string of letters, digits or symbols that may be used to encode or decode information.

Advertisement field 720 may include advertisements provided by and associated with companies (e.g., companies offering coupon codes). For example, advertisement field 720 may include entries for "Ad1," "Ad2," "Ad3," etc. Each of the advertisements provided in advertisement field 720 may include an advertisement (or promotion) associated with a product and/or service.

Code field 730 may include entries 780 providing codes associated with the advertisements provided in advertisement field 720. For example, code field 730 may indicate that "Ad1" (e.g., provided in advertisement field 720) is associated with "Code1," that "Ad2" (e.g., provided in advertisement field 720) is associated with "Code2," and that "Ad3" (e.g., provided in advertisement field 720) is associated with "Code3." Each of the codes provided in code field 730 may include a unique validation code that includes an identification associated with a STB and/or an identification associated with an advertisement (e.g., provided in advertisement field 720).

Instructions field 740 may include entries 780 providing instructions associated with the codes provided in code field 730. For example, instructions field 740 may indicate that "Code1" (e.g., provided in code field 730) is associated with "Instructions1," that "Code2" (e.g., provided in code field 730) is associated with "Instructions2," and that "Code3" (e.g., provided in code field 730) is associated with "Instructions3." Each of the instructions provided in instructions field 740 may include instructions for claiming the product/service promotion associated with the codes provided in code field 730 (e.g., instructions to log into a web account associated with STB 120, such as a web account associated with television services provided by STB 120).

Valid date field 750 may include entries 780 providing valid dates (or expiration dates) associated with the codes provided in code field 730. For example, valid date field 750 may indicate that "Code1" (e.g., provided in code field 730) is valid until "Date1," that "Code2" (e.g., provided in code field 730) is valid until "Date2," and that "Code3" (e.g., provided in code field 730) is valid until "Date3." Each of the dates provided in valid date field 750 may be used to determine if the codes provided in code field 730 are valid (i.e., have not expired).

Product/service information field 760 may include entries 780 providing information for products and/or services associated with the codes provided in code field 730. For example, product/service information field 760 may indicate that "Code1" (e.g., provided in code field 730) is associated with "Info1," that "Code2" (e.g., provided in code field 730) is associated with "Info2," and that "Code3" (e.g., provided in code field 730) is associated with "Info3." In one exemplary implementation, the information provided in product/service information field 760 may include a description of the product/service, a cost of the product/service, a discount associated with the product/service, promotional information associated with the product/service, etc.

STB ID field 770 may include identification information associated with STBs (e.g., STB 120). For example, STB ID field 770 may include entries for "STB ID1," "STB ID2," "STB ID3," etc. In one implementation, each of the STB IDs provided in STB ID field 770 may include identification information associated with STBs to which an advertisement (e.g., provided advertisement field 720) is provided.

As further shown in FIG. 7, a request 790 (e.g., received by server 140 from STB 120) may be compared to the information provided in database portion 700. Request 790 may include the features described above in connection with request/STB identification 330 (FIG. 3A). For example, request 790 may include an identification associated with a STB (e.g., "STB1"), and a request for the promotion associated with an advertisement (e.g., "Ad1"). Server 140 may receive request 790, and may confirm that the promotion associated with advertisement (e.g., "Ad1") is valid by examining the valid date (e.g., "Date1") provided in valid date field 750.

If server 140 determines that the promotion associated with an advertisement (e.g., "Ad1") is valid (e.g., via examination of database portion 700), server 140 may encrypt and provide a response 795 to STB 120. In one implementation, server 140 may encrypt response 795 with a public encryption key (e.g., "Key1"). Response 795 may include the public encryption key (e.g., "Key1"), a code (e.g., "Code1") associated with the advertisement (e.g., "Ad1"), instructions (e.g., "Instructions1") associated with the code (e.g., "Code1"), and a STB ID (e.g., "STB ID1") associated with the code (e.g., "Code1").

Although FIG. 7 shows exemplary information that may be provided in database portion 700, in other implementations, database portion 700 may contain fewer, different, or additional information than depicted in FIG. 7.

FIG. 8 depicts a diagram of exemplary functional components of server 140. As illustrated, server 140 may include product/service receiver logic 800, a database 805, ad provider logic 810, STB request receiver logic 815, code/instruction provider logic 820, and/or validation logic 825. The functions described in FIG. 8 may be performed by one or more of the exemplary components of device 200 depicted in FIG. 2.

Product/service receiver logic 800 may include any hardware, software, or combination of hardware and software based logic (e.g., processing logic 220) that enables server 140 to receive public encryption key 305, an advertisement 830, a code 835, instructions 840, and other information 845 from a company. Public encryption key 305 may include the features described above in connection with FIG. 3A. Advertisement 830 may include an advertisement associated with a product and/or service provided by the company. Code 835 may include a code (e.g., a coupon code) associated with advertisement 830. Instructions 840 may include one or more instructions associated with advertisement 830. Other information 845 may include other information associated with advertisement 830, such as a validity or expiration date associated with code 835, product and/or service information, etc. Product/service receiver logic 800 may provide public encryption key 305, advertisement 830, code 835, instructions 840, and other information 845 to database 805 for storage (e.g., in database portion 700).

Database 805 may include a storage device (e.g., main memory 230, ROM 240, storage device 250, etc.) that may store information received by product/service receiver logic 800. In one implementation, database 805 may store information described above in connection with database portion 700 (FIG. 7).

Ad provider logic 810 may include any hardware, software, or combination of hardware and software based logic (e.g., processing logic 220) that receives advertisement 830 from database 805, and provides advertisement 830 to a STB (e.g., STB 120) for display via a television (e.g., television 110).

STB request receiver logic 815 may include any hardware, software, or combination of hardware and software based logic (e.g., processing logic 220) that receives (e.g., from STB 120) a request 850 and/or a STB ID 855, and provides request 850 and/or STB ID 855 to code/instruction provider logic 820. Request 850 may include a request for the promotion associated with advertisement 830. STB ID 855 may include information (e.g., a serial number, numbers, letters, etc.) identifying STB 120 to server 140.

Code/instruction provider logic 820 may include any hardware, software, or combination of hardware and software based logic (e.g., processing logic 220) that receives request 850 and/or STB ID 855 from STB request receiver logic 815, and receives public encryption key 305, code 835, and instructions 840 from database 805. Code/instruction provider logic 820 may encrypt code 835 and instructions 840 with public encryption key 305, based on request 850 and/or STB ID 855, and may provide code 835 and instructions 840 to STB 120. In one implementation, code/instruction provider logic 820 may combine public encryption key 305, code 835, instructions 840, and STB ID 855 into an encrypted response (e.g., response 795, FIG. 7), and may provide the encrypted response to STB 120.

Validation logic 825 may include any hardware, software, or combination of hardware and software based logic (e.g., processing logic 220) that receives code 835 and/or STB ID 855 from user device 150, and may compare code 835 with information provided in database 805 (e.g., to determine if code 835 is valid). In one implementation, validation logic 825 may decrypt code 835 (e.g., via public encryption key 305) to obtain STB ID 855 and/or an identification associated with advertisement 830. Validation logic 825 may validate STB ID 855, and may provide product and/or service information 860 to user device 150 if STB ID 855 is validated. In one example, validation logic 825 may determine whether STB ID 855 matches a STB identification (e.g., provided in database 805), whether the promotion associated with code 835 is still valid, whether the user already claimed the promotion associated with code 835, etc. If STB ID 855 is not validated, validation logic 825 may not provide product and/or service information 860 to user device 150.

Although FIG. 8 shows exemplary functional components of server 140, in other implementations, server 140 may contain fewer, different, or additional functional components than depicted in FIG. 8. In still other implementations, one or more functional components of server 140 may perform one or more other tasks described as being performed by one or more other functional components of server 140.

Figure 10:
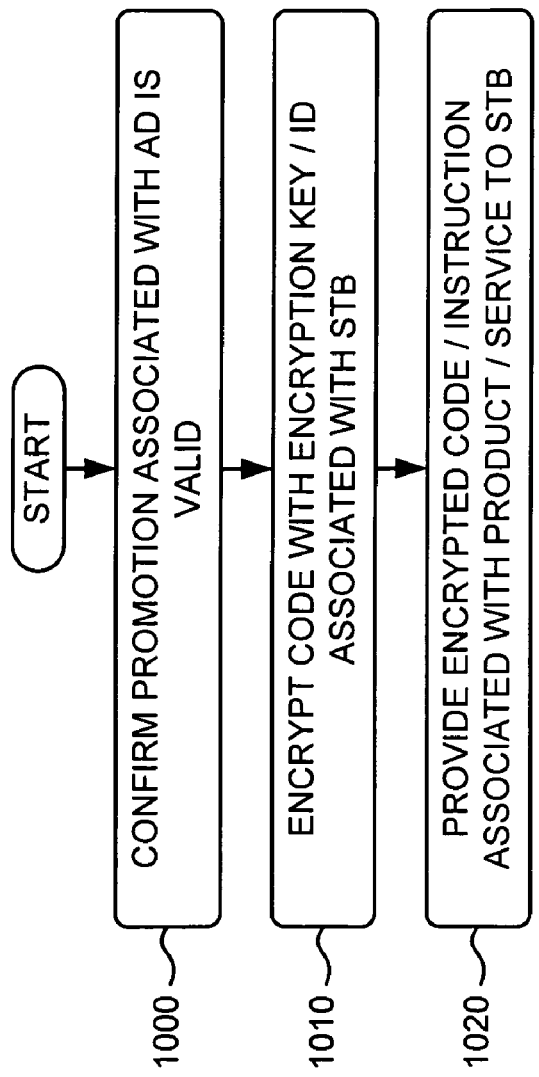
Figure 11:
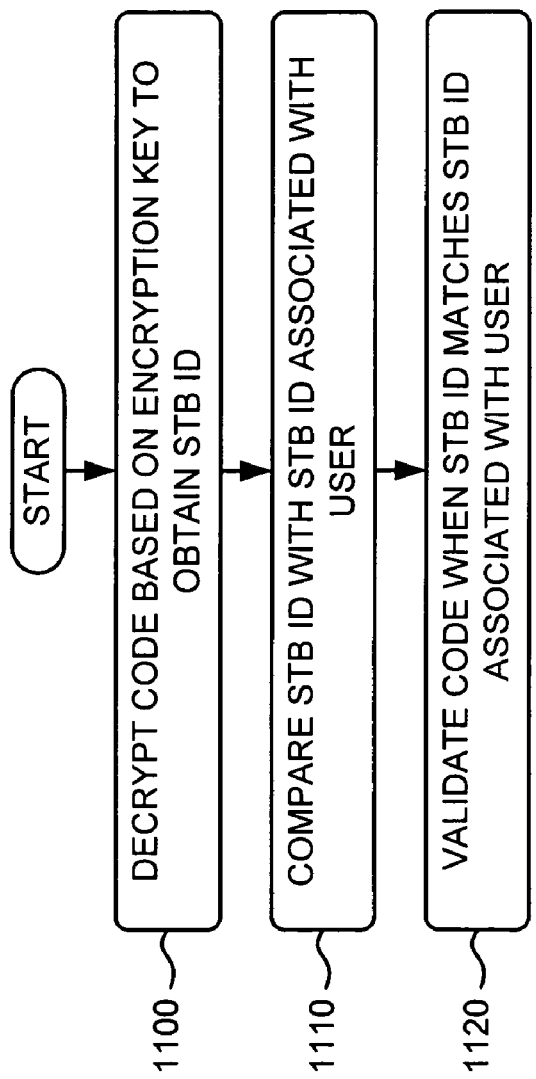

FIGS. 9-11 illustrate flow charts of an exemplary process 900 for using television as a distribution medium for a coupon code, according to implementations described herein. In one implementation, process 900 may be performed by server 140. In another implementation, some or all of process 900 may be performed by another device or group of devices, including or excluding server 140.

As illustrated in FIG. 9, process 900 may begin with receipt of an advertisement, a code, an instruction, an encryption key, and/or information associated with a product and/or service (block 910), and providing the advertisement to a set-top box (STB) for display (block 920). For example, in implementations described above in connection with FIG. 3A, server 140 may receive (e.g., from a company) public encryption key 305 and advertisement (ad) information 310 associated with a company wishing to use television as a distribution medium for a product and/or service associated with a coupon code. As described above, public encryption key 305 may include a string of letters, digits or symbols that may be used to encode or decode information. Advertisement information 310 may include an advertisement associated with a product and/or service, a code (e.g., a coupon code) associated with the advertisement, one or more instructions associated with the advertisement, a validity or expiration date associated with the code, product and/or service information, etc. Server 140 may broadcast an advertisement (e.g., an advertisement associated with a product and/or service), as indicated by reference number 315, on television 110, via STB 120.

As further shown in FIG. 9, a request for a promotion associated with the advertisement and an identification associated with the STB may be received from the STB (block 930), and, in response, the code and the instruction associated with the product and/or service may be provided to the STB (block 940). For example, in implementations described above in connection with FIGS. 3A and 3B, STB 120 may receive broadcast advertisement 315 from server 140, and may display advertisement 320 and selection mechanism 325 on television 110. If a viewer of television 110 selects selection mechanism 325 (e.g., via remote control 130), STB 120 may provide a request and an identification associated with STB 120 to server 140, as indicated by reference number 330. In one example, the request may include a request for the promotion associated with advertisement 320. The STB identification may include information (e.g., a serial number, numbers, letters, etc.) identifying STB 120 to server 140. Server 140 may receive request/STB identification 330. If server 140 determines that the promotion associated with advertisement 320 is valid, server 140 may encrypt and provide response 335 to STB 120. Response 335 may include code 340 (e.g., a coupon code) associated with advertisement 320, and instructions 345 associated with code 340.

Returning to FIG. 9, a claim for the code and the STB identification may be received from a user (block 950), the code and the STB identification may be validated with a STB identification associated with the user (block 960), and the product and/or service information may be provided to the user when the code and the STB identification are validated (block 970). For example, in implementations described above in connection with FIG. 3B, if a user associated with STB 120 views code 340 and/or instructions 345, the user (e.g., via user device 150) may access server 140 (e.g., may log into an account, associated with the user, that may be maintained by server 140), and may provide claim 350 for code 340 to server 140. Claim 350 may involve the user inputting (e.g., via user device 150) code 340. Server 140 may receive claim 350 (e.g., code 340 input by the user). Server 140 may validate the identification associated with STB 120 (and/or code 340), as indicated by reference number 355, and may provide product and/or service information 360 to user device 150 if the identification associated with STB 120 (and/or code 340) is validated by server 140.

Process block 940 may include the process blocks depicted in FIG. 10. As shown in FIG. 10, process block 940 may include confirming a promotion associated with the advertisement is valid (block 1000), encrypting the code with the encryption key and STB identification (block 1110), and providing the encrypted code and the instruction associated with the product and/or service to the STB (block 1120). For example, in implementations described above in connection with FIG. 3B, server 140 may determine whether the promotion associated with advertisement 320 expired, has already been claimed by the user associated with STB 120, etc. If server 140 determines that the promotion associated with advertisement 320 is valid, server 140 may encrypt and provide response 335 to STB 120. In one example, server 140 may encrypt response 335 with public encryption key 305. Response 335 may include code 340 (e.g., a coupon code) associated with advertisement 320, and instructions 345 associated with code 340. Code 340 may include a unique validation code that includes an identification associated with STB 120 and/or an identification associated with advertisement 320 (e.g., identification associated with a product/service promotion).

Process block 960 may include the process blocks depicted in FIG. 11. As shown in FIG. 11, process block 960 may include decrypting a user input code, based on the encryption key, to obtain the STB identification (block 1100), comparing the STB identification with the STB identification associated with the user (block 1110), and validating the code when the STB identification matches the STB identification associated with the user (block 1120). For example, in implementations described above in connection with FIG. 3B, server 140 may decrypt code 340 (e.g., via public encryption key 305) to obtain the identification associated with STB 120 and/or the identification associated with advertisement 320. Server 140 may validate the identification associated with STB 120, as indicated by reference number 355. In one example, server 140 may determine whether the identification associated with STB 120 matches a STB identification (e.g., provided in a database maintained by server 140). Server 140 may validate code 340 when the identification associated with STB 120 matches the STB identification provided in the database maintained by server 140.

Systems and/or methods described herein may enable companies to use television as a distribution medium for a coupon code (e.g., a product and/or service associated with the coupon code). The systems and/or methods may prevent coupon code misuse, may prevent double dipping, may prevent minors from requesting inappropriate products and/or services associated with the coupon code, and/or may guarantee that the coupon code may be redeemed within a limited time frame. In one implementation, for example, the systems and/or methods may receive an advertisement, a code, an instruction, an encryption key, and/or information associated with a product and/or service, and may provide the advertisement to a STB for display (e.g., via a television). The systems and/or methods may receive, from the STB, a request for a promotion associated with the advertisement and an identification associated with the STB, and may provide the code and the instruction associated with the product/service to the STB. The systems and/or methods may receive a claim for the code and a STB identification from a user, may validate the code and the STB identification, and may provide the product/service information to the user when the code and the STB identification are validated.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 9-11, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a server device, an advertisement, a code, and information associated with one of a product or a service;
   providing, by the server device, the advertisement to a set-top box (STB) for display, with a broadcast program, in a first screenshot;
   receiving, by the server device and from the STB, a request for a promotion associated with the advertisement and an identification associated with the STB;
   determining, by the server device, if the requested promotion has been previously claimed by the STB;
   providing, by the server device and based on determining that the requested promotion has not been previously claimed by the STB, the code associated with the one of the product or the service to the STB and an instruction, associated with the one of the product or the service, to log into a web account associated with the STB, for display, in a second screenshot;
   providing, by the server device and for display, information regarding an interface for receiving a claim for the code, the interface being rendered in a third screenshot;
   receiving, by the server device and based on an input from a computing device, the claim for the code and the identification associated with the STB, the claim for the code and identification associated with the STB being received by the server device based on the input from the computing device;
   validating, by the server device, the claim for the code and the identification associated with the STB based on an identification associated with the computing device; and
   providing, by the server device, the information associated with the one of the product or the service when the claim for the code and the identification associated with the STB are validated.

2. The method of claim 1, where providing the code associated with the one of the product or the service comprises:
   confirming whether the promotion associated with the advertisement is valid,
   encrypting the code with an encryption key and the identification associated with the STB when the promotion is valid, and
   providing the encrypted code associated with the one of the product or the service to the STB for display.

3. The method of claim 2, where validating the claim for the code and the identification associated with the STB comprises:
   decrypting the code with the encryption key,
   comparing the identification associated with the STB with a STB identification associated with a user of the computing device, and
   validating the decrypted code when the identification associated with the STB matches the STB identification associated with the user.

4. The method of claim 1, where the code comprises at least one of:
   an Internet coupon,
   a promotional code,
   a discount code,
   a key code,
   a shopping code,
   a voucher code,
   a source code, or
   a validation code.

5. The method of claim 2, where the encryption key comprises a string of at least one of letters, digits, or symbols, the string being used to encode and decode information.

6. The method of claim 5, where the encryption key is used to transform information into unreadable information, and transform unreadable information into readable information.

7. A method comprising:
   receiving, by a computing device and from a server device, an advertisement associated with one of a product or a service;
   causing, by the computing device, the advertisement to be displayed, with a broadcast program, in a first screenshot;
   generating, by the computing device, a request for a promotion associated with the advertisement and an identification associated with the computing device;
   receiving, by the computing device and from the server device, an indication if the requested promotion has been previously claimed by the computing device;
   receiving, by the computing device and from the server device, a code and an instruction, associated with the one of the product or the service, to log into a web account associated with the computing device, the code being received if the requested promotion has not been previously claimed by the computing device;

causing, by the computing device, the code and the instruction to be displayed, in a second screenshot;

providing, by the computing device and for display, an interface for receiving a claim for the code, the interface being rendered in a third screenshot;

receiving, by the computing device, the claim for the code, the claim for the code being received by the computing device based on an input from a user computing device;

receiving, by the computing device and from the server device, validation information associated with the claim for the code and based on the code and the identification associated with the computing device; and providing, by the computing device and based on the validation information, the information associated with the one of the product or the service when the claim for the code and the identification associated with the computing device are validated.

8. The method of claim 7, where the computing device comprises a set-top box (STB).

9. The method of claim 7, where the user computing device comprises one or more of:
a radiotelephone;
a personal communications system (PCS) terminal;
a personal digital assistant (PDA);
a laptop computer; or
a personal computer.

10. The method of claim 7, where the validation information is further based on identification information with a television viewer associated with the computing device.

11. A device, comprising:
a memory to store a plurality of instructions; and
a processor to execute instructions in the memory to:
receive, from a server, an advertisement, a code, an instruction, and information associated with one of a product or a service,
provide the advertisement for display, with a broadcast program, in a first screenshot,
receive a request for a promotion associated with the advertisement and an identification associated with a device,
determine if the requested promotion has been previously claimed by the device;
provide the code and the instruction, associated with the one of the product or the service, to log into a web account associated with the device, for display, in a second screenshot, when the requested promotion has not been previously claimed by the device,
provide, for display, an interface for receiving a claim for the code, the interface being rendered in a third screenshot;
receive, from a computing device, a claim for the code and the identification associated with the device, the claim for the code and the identification associated with the device being received based on an input from the computing device,
validate the claim for the code and the identification associated with the computing device based on an identification associated with the computing device; and
provide the information associated with the one of the product or the service when the claim for the code and the identification associated with the device are validated.

12. The device of claim 11, where the device includes a set-top box (STB).

13. The device of claim 11, where the processor is further to execute instructions in the memory to:
provide, to the computing device, the information associated with the one of the product or the service when the claim for the code and the identification associated with the device are validated.

14. The device of claim 11, where the processor is further to execute instructions in the memory to:
receive the code and the identification associated with the device when the promotion is valid, the code being encrypted with an encryption key, and
provide the encrypted code and the instruction, associated with the one of the product or the service, for display.

15. The device of claim 14, where the processor is further to execute instructions in the memory to:
decrypt the code with the encryption key,
compare the identification associated with the device with an identification associated with a user of the computing device, and
validate the decrypted code when the identification associated with the device matches the identification associated with the computing device.

16. The device of claim 11, where the code comprises at least one of:
an Internet coupon,
a promotional code,
a discount code,
a key code,
a shopping code,
a voucher code,
a source code, or
a validation code.

17. The device of claim 14, where the encryption key comprises a string of at least one of letters, digits, or symbols, the string being used to encode and decode information.

18. The device of claim 17, where the encryption key is used to perform symmetric encryption.

19. A server, comprising:
one or more processors to:
provide an advertisement associated with one of a product or a service to a device for display, with a broadcast program, in a first screenshot,
receive, from the device, a request for a promotion associated with the advertisement and an identification associated with the device,
determine if the requested promotion has been previously claimed by the device;
provide a code and an instruction to log into a web account associated with the device and associated with the one of the product or the service to the device, for display in a second screenshot and based on determining that the requested promotion has not been previously claimed by the device,
provide information to generate an interface for receiving a claim for the code, the interface to be rendered in a third screenshot,
receive, based on an input from a computing device, a claim for the code and the identification associated with the device, the claim for the code and identification being received based on transmission of the code that is displayed in the second screenshot,
validate the claim for the code and the identification associated with the device; and provide the information associated with the one of the product or the service when the claim for the code and the identification associated with the device are validated.

20. The server of claim 19, where the device comprises a set-top box (STB).

21. The server of claim 19, where the one or more processors are further to:
confirm whether the promotion associated with the advertisement is valid,
encrypt the code with an encryption key associated with the one of the product or the service and the identification associated with the device when the promotion is valid, and
provide the encrypted code and the instruction associated with the one of the product or the service to the device for display.

22. The server of claim 21, where the one or more processors are further to:
decrypt the code with the encryption key, the encryption key comprising a string of at least one of letters, digits, or symbols, the string being used to encode and decode information.

23. The method of claim 7, further comprising:
providing, for display and in the second screenshot, the broadcast program with the code and the instruction.

24. The method of claim 7, further comprising:
providing, for display and in the third screenshot, the information regarding an interface for receiving a claim for the code without providing, for display in the third screenshot, the broadcast program.

25. The device of claim 11, where the processor is further to:
provide, for display and in the second screenshot, the broadcast program with the code and the instruction.

* * * * *